United States Patent
Oliver, Jr.

(10) Patent No.: US 7,161,415 B2
(45) Date of Patent: Jan. 9, 2007

(54) CURRENT MODULATION FILTER

(76) Inventor: Harry S. Oliver, Jr., 2701 Pfefferkorn Rd., West Friendship, MD (US) 21794

( * ) Notice: Subject to any disclaimer, the term of this patent is extended or adjusted under 35 U.S.C. 154(b) by 0 days.

(21) Appl. No.: 10/950,465

(22) Filed: Sep. 28, 2004

(65) Prior Publication Data

US 2006/0066366 A1    Mar. 30, 2006

(51) Int. Cl.
*H03K 5/00* (2006.01)
(52) U.S. Cl. .................. 327/551; 327/531; 327/532
(58) Field of Classification Search ............. 327/108, 327/110, 551, 311, 552, 531, 532
See application file for complete search history.

(56) References Cited

FOREIGN PATENT DOCUMENTS

JP          02000329799 A    * 11/2000

* cited by examiner

*Primary Examiner*—Dinh T. Le
(74) *Attorney, Agent, or Firm*—Rosenberg, Klein & Lee

(57) ABSTRACT

A current modulation filter for mitigating fluctuations in current on a power supply line due to time dependent current demands of a load circuit includes a biasing circuit for providing a source voltage reference and a quiescent current reference and a load voltage sensing circuit for providing a voltage measurement of the operating voltage of the load circuit. A current sensing circuit is electrically interposed between the power source and the load circuit. A voltage drop across the current sensing circuit is transmitted as a voltage difference to a current controller which subsequently supplies or sinks current to the power supply line so as to maintain a constant current level thereon.

15 Claims, 2 Drawing Sheets

CURRENT MODULATION FILTER

BACKGROUND OF THE INVENTION

1. Field of the Invention

The invention described herein is directed to supply line filtering for power supplies. More specifically, the present invention compensates for fluctuations in a power supply current caused by time-dependent fluctuation and load current demand.

2. Description of the Prior Art

Although line filtering of supply lines in power distribution systems is well known, it continues to be a field in which beneficial improvements are made. The widespread use of the switching power supplies and electronic circuitry, especially in personal computers, have allowed smaller packaging of systems, but often must be accompanied by supply line filtering to ensure proper operation of the load circuitry.

Of course, not all supply line noise is caused by the supply side circuitry. Time-dependent load demand also introduces a noise component on the supply line, which is typically overcome by adequate regulation of the power supply. Generally, the power regulation is implemented at the power supply using a separate voltage sensing circuit coupled to the load.

In many applications, such as in laser light modulation of optical computing and optical communication, fluctuations in supply current due to changing load conditions present not only power regulation problems, but also considerable security concerns. This is because the modulation of laser light, which forms the transmitted data, may be introduced onto the power supply line as a modulated current. The current modulation may easily be read by an inductive probe coupled to the supply line. This allows a third party to monitor communications which would otherwise be secure.

Prior art line filters which are designed to mitigate amplitude modulation of voltages fail to prevent current modulation of the supply line in systems where the power source has a low internal impedance and where the frequency distribution of the modulation is low. In such systems, current in the supply line can be modulated to a significant degree without a correspondingly significant degree of voltage modulation.

In light of the foregoing discussion of the prior art, there is an apparent need for a current modulation filter for mitigating current fluctuations in a power distribution system.

SUMMARY OF THE INVENTION

The present invention is a current modulation filter to be electrically interposed between a power source and a load circuit. The current modulation filter of the present invention includes a biasing circuit having a first voltage reference node and a current reference node and is electrically coupled in parallel connection to the power source. The current modulation filter also includes a load voltage measurement circuit having a second voltage reference node and being electrically coupled in parallel connection to the load circuit. A current sensing circuit is series connected between the power source and the load circuit and a current control circuit is coupled to the first voltage reference node, the second voltage reference node, the current reference node and to the load circuit. The current control circuit supplies electrical current to, or sinks electrical current from, the load circuit in response to a voltage difference between the first voltage reference node and the second voltage reference node such that current through the current sensing circuit remains constant to within a predetermined value over a predetermined range of load current demand.

DETAILED DESCRIPTION OF THE PREFERRED EMBODIMENTS

Figure 1:
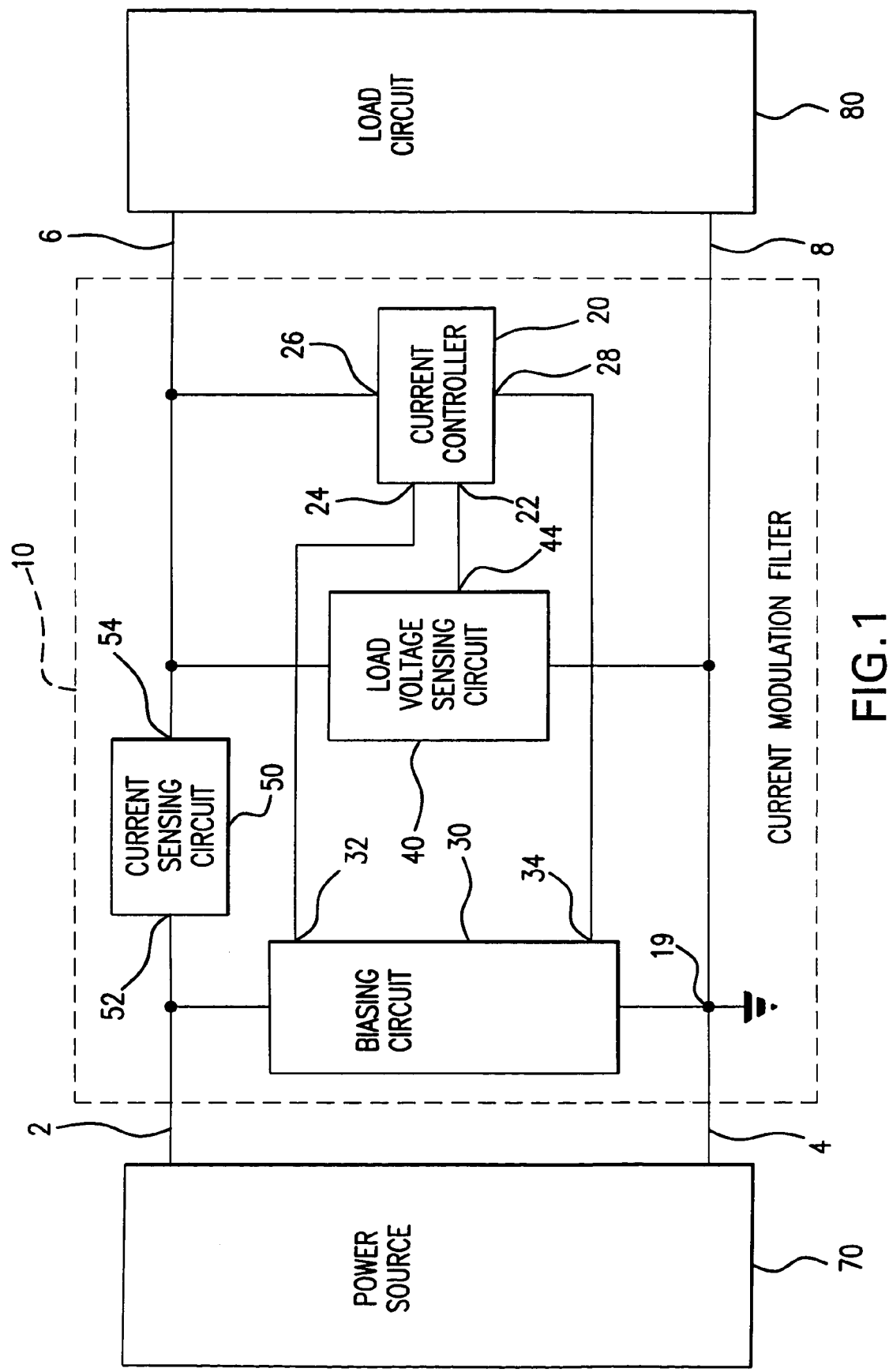
FIG. 1 is a block diagram illustrating the basic architecture of the current modulation filter of the present invention.

Referring to FIG. 1, there is shown a block diagram illustrating the interconnection of the primary components of the present invention. As illustrated in the Figure, current modulation filter 10 is electrically interposed between a power source 70 and a load circuit 80. Whereas the current modulation filter of FIG. 1 is shown as a separate component, it should be obvious to the ordinarily skilled artisan that the current modulation filter of the present invention may be incorporated into other elements within an electronic system.

Current modulation filter 10 is coupled to power source 70 via supply line 2 and ground reference line 4 and is coupled to load circuit 80 via supply line 6 and ground reference line 8. In certain embodiments of the present invention, as is shown in FIG. 1, ground reference line 4 and ground reference line 8 are connected together at a common reference node 19, which is generally electrically coupled to a system ground terminal.

As shown in FIG. 1, current modulation filter 10 includes a biasing circuit 30 for providing a power source voltage reference at terminal 32 and for setting a quiescent current of current controller 20 at terminal 34. Current modulation filter 10 further includes a load voltage sensing circuit 40 which provides a voltage level corresponding to that of supply line 6 at terminal 44.

Supply line 2 on the side of the power source is separated from supply line 6 on the side of the load circuit by a current sensing circuit 50. Current sensing circuit 50 provides a voltage difference at terminal 54 with respect to terminal 52 when current passes therethrough. This difference in voltage is detected and reproduced as a voltage difference between the source reference voltage at terminal 32 and the load reference voltage at terminal 44. The voltage difference is transmitted to current controller 20 at terminals 24 and 22. Current controller 20 will add or subtract current at terminal 26 so that the current in supply line 6 remains constant. Stated another way, the current controller supplies electrical current to, or sinks electrical current from, supply line 6 so that the voltage difference across current sensing circuit 50 remains constant. When the voltage difference in current sensing circuit 50 is constant, so too is the current flowing therethrough, which thereby extinguishes any current modulation to within acceptable levels.

Figure 2:
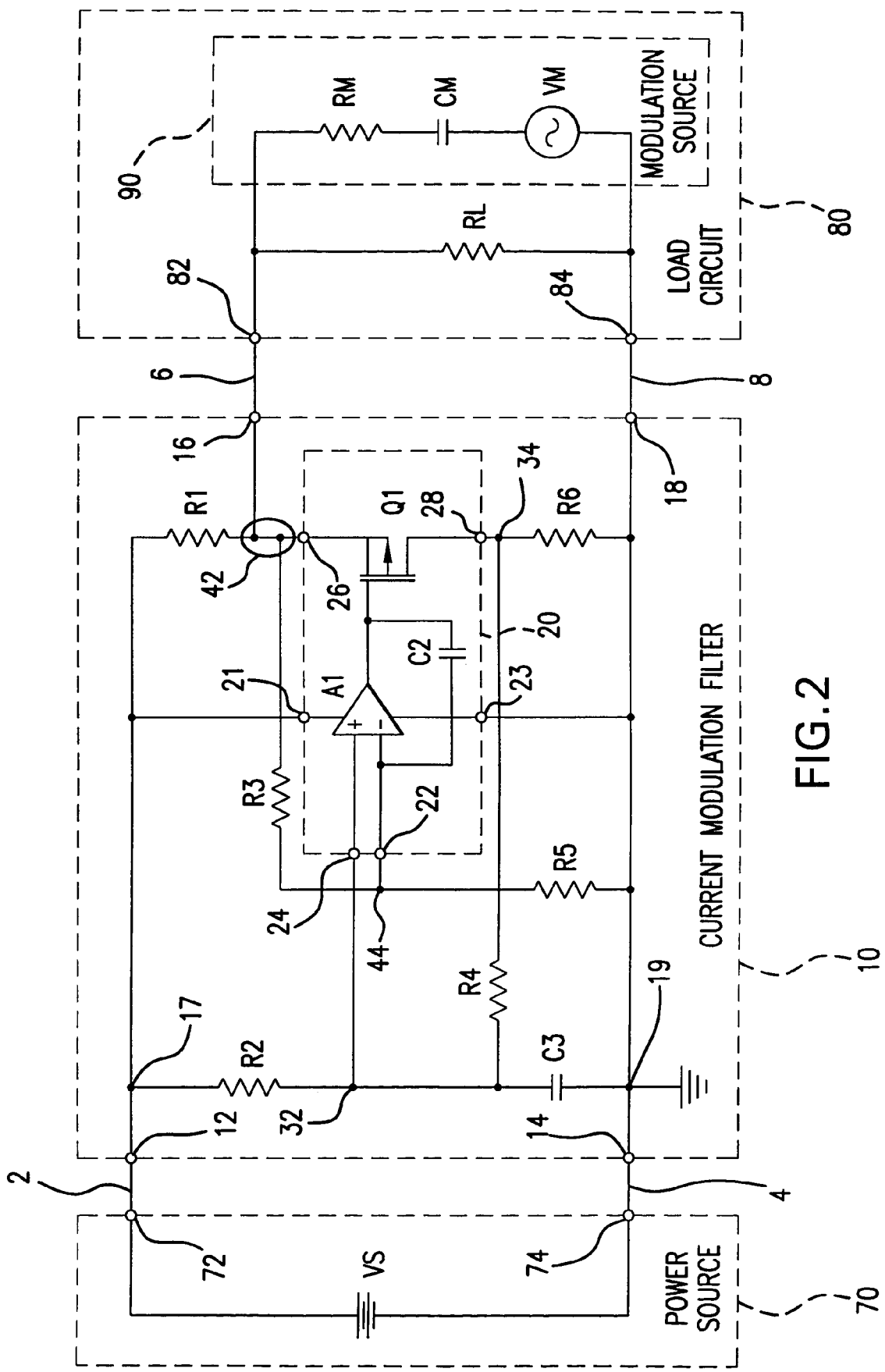
FIG. 2 is a schematic diagram of an exemplary embodiment of the current modulation filter of the present invention.

Referring now to FIG. 2, there is shown a schematic diagram of an exemplary embodiment of the current modulation filter of the present invention. Note that like reference indicators in FIG. 2 with those of FIG. 1 refer to the same element in both figures.

As is shown in FIG. 2, current modulation filter 10 is electrically interposed between power source 70 and load circuit 80. Power source 70 is represented by a DC voltage source producing a voltage VS. This voltage is produced at supply terminal 72 with reference to ground terminal 74. Power source 70 is coupled to the current modulation filter at terminals 12 and 14 by supply line 2 and reference line 4, respectively.

Load circuit 80 is coupled to current modulation filter 10 via supply line 6 and reference line 8 at delivery terminal 82 and ground terminal 84, respectively. The load circuit is modeled as a load resistance RL and parallel with a modulation source circuit 90 represented as the series connection of AC voltage source VM, capacitor CM and resistor RM. As previously stated, the actual modulation of current on supply line 6 may be produced by the driver circuitry of a laser diode in a laser communication system. For simplicity, this modulation is modeled by the current modulation source 90 for producing the current modulation on supply line 6.

Biasing circuit 30 of FIG. 1 is constructed in FIG. 2 from series-connected resistors R2, R4 and R6 and bypass capacitor C3. The series-connected resistors R2, R4, R6 are interconnected at interposing nodes 32 and 34, which function as the source voltage reference node and the quiescent current reference node, respectively. The biasing network 30 is electrically coupled to the supply line 2 at terminal 17 and is coupled to reference line 4 at node 19.

Load voltage sensing circuit 40 is constructed in FIG. 2 from series-connected resistors R3 and R5. The series-connected resistors R3 and R5 are interconnected at interposing node 44, which serves as the load voltage reference node. Load voltage sensing circuit 40 is coupled to supply line 6 at terminal 42 and to reference line 8 at terminal 19. As is shown in FIG. 2, and was discussed with reference to FIG. 1, reference lines 4 and 8 are interconnected at terminal 19 which is further connected to a system ground terminal.

Current sensing circuit 50 is constructed from a small resistor R1, as shown in FIG. 2. Resistor R1 produces a voltage drop corresponding to the current flowing therethrough. A corresponding voltage difference is produced at load voltage reference node 44 with respect to source voltage reference node 32. The voltage difference is provided to current controller 20 at terminals 22 with respect to terminal 24.

In the exemplary embodiment of FIG. 2, current controller 20 is an active circuit consisting of a high gain operational amplifier A1 and transistor Q1. Whereas transistor Q1 is shown as a field effect transistor, it should be understood that other transistor architectures, such as bipolar junction transistors, may be used. Transistor Q1 supplies, or sinks, the necessary current to maintain the constant current level on supply line 6, as discussed hereinabove. Similarly, where amplifier A1 is shown in FIG. 2 as an operational amplifier, other differential amplifiers may be used, provided the amplifier has sufficient gain to produce an amplified voltage signal responsive to very small voltage differences presented at its inputs.

The gate of transistor Q1 (or the base of a bipolar junction transistor) is electrically coupled to the output terminal of amplifier A1 to receive a control signal therefrom. The control signal is the aforementioned voltage swing responsive to the voltage difference presented at its input terminals. The source of transistor Q1 (or the collector in the bipolar junction transistor) is connected to the current reference node 34 via terminal 28 of current control circuit 20. As previously stated, current reference node 34 biases transistor Q1 at a specific, predetermined quiescent current level by methods well known in the art. Bypass capacitor C3 removes any modulation from the positive input of amplifier A1, i.e., assures that voltage reference node 32 is maintained at a constant reference voltage.

The drain of transistor Q1 (or the emitter of a bipolar junction transistor) is coupled to the load circuit 80 via terminal 26 of current controller 20. As is well known, transistor Q1 will produce a current in the drain thereof responsive to a voltage at its gate in an approximately linear manner. Thus, the voltage produced by amplifier A1 subsequently produces a corresponding current in the drain of transistor Q1 so as to maintain a constant current level on supply line 6. Capacitor C2 is provided to add stability to the high gain amplifier A1, which is a well known stabilization technique.

As shown in FIG. 2, amplifier A1 receives its operating power from power source 70 via terminals 21 and 23. Thus, amplifier A1 should be constructed and properly bypassed, so as to prevent modulation of current in supply line 2 corresponding to the modulation signal produced at its output. Without this precaution, current flowing through R1 would simultaneously be modulated by the current modulation on supply line 6 caused by the load circuit modulation source and by the current modulation on supply line 2 caused by the fluctuating rail voltage of amplifier A1. It should then be apparent that such an arrangement would minimize the effectiveness of current modulation filter 10.

The effectiveness of the current modulation filter of the present invention may be demonstrated by way of a specific example by setting the circuit elements of FIG. 2 to the values shown in Table 1.

TABLE 1

Exemplary Circuit Parameters

| CIRCUIT ELEMENT | VALUE |
| --- | --- |
| VS | 9 VDC |
| VM | 17 V p—p, 50 Ω |
| CM | 100 µF |
| RM | 120 Ω |
| RL | 17 Ω |
| R1 | 1 Ω |
| R2 | 1.8 kΩ |
| R3 | 1 kΩ |
| R4 | 3.6 kΩ |
| R5 | 2.7 kΩ |
| R6 | 40 Ω |
| C2 | 5 pF |
| C3 | 22 µF |

Resistor R6 is used to set the quiescent bias current of Q1, which is set to 50 mA DC in the exemplary embodiment. Additionally, the biasing circuit 30 sets the source voltage reference node 32 at 6.7 VDC. When the circuit of FIG. 2 is constructed with the values of Table 1 and a current probe is coupled to supply line 2 and an additional current probe is coupled to supply line 6, a 70 dB reduction and current modulation in supply line 2 as compared to supply line 6 has been measured.

The above description is illustrative and not restrictive. Any variations, alternatives and modifications will become apparent to those of skill in the art upon review of this disclosure. The scope of the invention should, therefore, be determined not with reference to the above description, but instead should be determined with reference to the appended claims along with their full scope of equivalents.

What is being claimed is:

1. A current modulation filter electrically interposed between a power source and a load circuit, comprising:
   a biasing circuit having a first voltage reference node and a current reference node, said biasing circuit electrically coupled in parallel connection to the power source;
   a load voltage measurement circuit having a second voltage reference node, said load voltage measurement circuit electrically coupled in parallel connection to the load circuit;
   a current sensing circuit series connected between the power source and the load circuit; and
   a current controller electrically coupled at a first input terminal thereof to said first voltage reference node, at a second input terminal thereof to said second voltage reference node, at a first output terminal thereof to the load circuit and at a second output terminal thereof to said current reference node, said current controller supplying electrical current to, or sinking electrical current from, the load circuit responsive to a voltage difference between said first input terminal thereof and said second input terminal thereof such that said current through said current sensing circuit remains substantially constant over a range of load current variations, said current controller including:
   (a) a difference amplifier having a first input terminal thereof connected as said first input terminal of said current control circuit and a second input terminal thereof connected as said second input terminal of said current control circuit; and
   (b) a current control circuit electrically coupled at a control terminal thereof to an output terminal of said difference amplifier and having a first output terminal thereof connected as said first output terminal of said current control circuit and a second output terminal thereof connected as said second output terminal of said current control circuit.

2. The current modulation filter as recited in claim 1, wherein said difference amplifier includes an operational amplifier having a positive input terminal connected as said first input terminal of said difference amplifier and a negative input terminal connected as said second input terminal of said difference amplifier.

3. The current modulation filter as recited in claim 1, wherein said current control circuit includes a field effect transistor having a gate terminal connected as said control terminal thereof a source terminal connected as said first output terminal thereof and a drain terminal connected as said second output terminal thereof.

4. The current modulation filter as recited in claim 1, wherein said current sensing circuit includes a resistor connected in series with the power source and the load circuit.

5. The current modulation filter as recited in claim 1, wherein said biasing circuit includes a plurality of resistors respectively connected in series at corresponding nodes, a first one of said corresponding nodes connected as said first voltage reference node and a second one of said corresponding nodes connected as said current reference node.

6. The current modulation filter as recited in claim 5, wherein said first voltage reference node is at a higher voltage potential than said current reference node.

7. The current modulation filter as recited in claim 6, wherein said biasing circuit is formed from three resistors respectively connected in series at said first voltage reference node and said current reference node.

8. A current modulation filter electrically interposed between a power source and a load circuit, comprising:
   a biasing circuit having a first voltage reference node and a current reference node, said biasing circuit electrically coupled in parallel connection to the power source;
   a load voltage measurement circuit having a second voltage reference node, said load voltage measurement circuit electrically coupled in parallel connection to the load circuit, said load voltage measurement circuit including a plurality of resistors respectively connected in series at corresponding nodes, one of said corresponding nodes being connected as said second voltage reference node;
   a current sensing circuit series connected between the power source and the load circuit; and
   a current controller electrically coupled at a first input terminal thereof to said first voltage reference node, at a second input terminal thereof to said second voltage reference node, at a first output terminal thereof to the load circuit and at a second output terminal thereof to said current reference node, said current controller supplying electrical current to, or sinking electrical current from, the load circuit responsive to a voltage difference between said first input terminal thereof and said second input terminal thereof such that said current through said current sensing circuit remains substantially constant over a range of load current variations.

9. The current modulation filter as recited in claim 8, wherein said load voltage measurement circuit is formed from two resistors connected in series at said second voltage reference node.

10. A current modulation filter for compensating for fluctuations in current from a power source due to time-dependent current demands of a load circuit, the current modulation filter being electrically interposed between the power source and the load circuit, the power source having a supply terminal for supplying power thereon and a ground terminal and the load circuit having a delivery terminal for receiving power thereon and a ground terminal, the current modulation filter comprising:
   a reference voltage node electrically coupled to the ground terminal of the power source and to the ground terminal of the load circuit;
   a current sensing circuit electrically coupled at a first terminal thereof to the supply terminal of the power source and at a second terminal thereof to the delivery terminal of the load circuit;
   a biasing circuit including a first plurality of resistors respectively connected in series at a corresponding set of interposing first nodes, said biasing circuit having a first terminal electrically coupled to the supply terminal of the power source and a second terminal thereof to said reference voltage node;
   a load voltage measurement circuit including a second plurality of resistors respectively connected in series at a corresponding interposing second node, said load voltage measurement circuit having a first terminal electrically coupled to the delivery terminal of the load circuit and at a second terminal thereof to said reference voltage node; and
   a current control circuit electrically coupled at a first input terminal thereof to one of said first nodes of said set of interposing first nodes, at a second input terminal thereof to said interposing second node, at a first output terminal thereof to the delivery terminal of the load circuit and at a second output terminal thereof to an other one of said first nodes of said set of interposing first nodes, said current control circuit supplying electrical current to, or sinking electrical current from, the delivery terminal of the load circuit responsive to a voltage difference between said first input terminal and said second input terminal thereof such that said current through said current sensing circuit remains substantially constant over a range of load current variations.

11. The current modulation filter as recited in claim 10, wherein said one node of said set of interposing first nodes is at a higher voltage potential than said other node of said set of interposing first nodes.

12. The current modulation filter as recited in claim 11, wherein said current control circuit includes:
   a differential amplifier having positive input terminal connected as said first input terminal of said current control circuit and a negative input terminal connected as said second input terminal of said current control circuit; and
   a transistor circuit electrically coupled at a control terminal thereof to an output terminal of said differential amplifier circuit, wherein a first controlled terminal is connected as said first output terminal of said current control circuit and a second controlled terminal is connected as said second output terminal of said current control circuit.

13. The current modulation filter as recited in claim 12, wherein said differential amplifier is an operational amplifier.

14. The current modulation filter as recited in claim 12, wherein said transistor circuit is a field effect transistor including a gate terminal connected as said control terminal thereof a source terminal connected as said first controlled terminal thereof and a drain terminal connected as said second controlled terminal thereof.

15. The current modulation filter as recited in claim 10, wherein said current sensing circuit includes a resistor connected in series with the supply terminal of the power source and the delivery terminal of the load circuit.

* * * * *